US007543305B2

(12) United States Patent
Ward

(10) Patent No.: US 7,543,305 B2
(45) Date of Patent: Jun. 2, 2009

(54) SELECTIVE EVENT REGISTRATION

(75) Inventor: Calvin Dean Ward, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 11/089,465

(22) Filed: Mar. 24, 2005

(65) Prior Publication Data
US 2006/0218372 A1 Sep. 28, 2006

(51) Int. Cl.
G06F 3/00 (2006.01)
(52) U.S. Cl. ...................................... 719/318
(58) Field of Classification Search ................ 719/313, 719/318; 718/105
See application file for complete search history.

(56) References Cited
U.S. PATENT DOCUMENTS

2002/0016792 A1* 2/2002 Ito et al. ...................... 707/200
2002/0120743 A1* 8/2002 Shabtay et al. .............. 709/226
2004/0078799 A1* 4/2004 Koning et al. ............... 719/313

* cited by examiner

Primary Examiner—Meng-Ai An
Assistant Examiner—Lechi Truong
(74) Attorney, Agent, or Firm—Owen J. Gamon

(57) ABSTRACT

A method, apparatus, system, and signal-bearing medium that, in an embodiment, register each partition in a logically-partitioned computer to send local events to an aggregation component and register a first partition to send events associated with a group of partitions to the aggregation component. In various embodiments, the group may be all of the partitions or some of the partitions. If the connection to the first partition is unavailable, the first partition is registered to cancel sending events associated with the group, a second partition is selected, and the second partition is registered to send events associated with the group to the aggregation component. If the connection to the first partition is restored subsequent to being unavailable, a determination is made whether to change registration back to the first partition. In this way, in an embodiment, redundant reporting of events is supported while decreasing the number of events reported.

9 Claims, 6 Drawing Sheets

138
PARTITION ATTRIBUTES

| PARTITION ID | ALWAYS ACTIVE | EVENT TYPES | |
|---|---|---|---|
| PARTITION A | YES | LOCAL | 205 |
| PARTITION X | YES | PLATFORM | 210 |
| PARTITION C | NO | LOCAL | 215 |
| PARTITION D | NO | GROUP A | 217 |

FIG. 2

SELECTIVE EVENT REGISTRATION

FIELD

An embodiment of the invention generally relates to computers. In particular, an embodiment of the invention generally relates to selective registration of events from a computer system.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago. One significant advance in computer technology is the development of parallel processing, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. From a software standpoint, multithreaded operating systems and kernels have been developed, which permit computer programs to concurrently execute in multiple threads, so that multiple tasks can essentially be performed at the same time.

In addition, some computers implement the concept of logical partitioning, where a single physical computer is permitted to operate essentially like multiple and independent virtual computers, referred to as logical partitions, with the various resources in the physical computer (e.g., processors, memory, and input/output devices) allocated among the various logical partitions. Each logical partition executes a separate operating system, and from the perspective of users and of the software applications executing on the logical partition, operates as a fully independent computer. The separate logical partitions typically operate under the control of a partition manager or hypervisor.

As the logical partitions execute, they encounter various events, e.g., errors due to software, firmware, hardware, or network problems. The type of these events may range from expected and benign to unexpected and serious, where an event that requires some sort of intervention, e.g., by a system administrator or technician, is often referred to as a "serviceable event." Further, some of these events, called local events, may be local to one particular partition and not encountered by any other partition. But, other events, called platform serviceable events, may be global and capable of being encountered by all partitions.

One current technique for handling events in a logically-partitioned system is for all partitions to receive platform serviceable events from firmware/hardware and forward them to a central aggregation component, called a hardware management console. These events may also be reported directly from the platform firmware or hardware to the hardware management console. This dual reporting provides a redundant path in order to guarantee delivery of the events, in case the path from the platform firmware/hardware to the hardware management console is lost or temporarily unavailable. Also, the partitions forward to the hardware management console the serviceable events that are local to the partitions. Thus, the hardware management console becomes the aggregation point for all serviceable events in the computer system. A drawback of this technique is that as the number of partitions increases, the number of redundant paths for reporting platform events to the hardware management console also increases. The impact on the hardware management console's and/or the computer system's performance may become significant as the number of partitions and the number of events recorded in the hardware management console escalate.

What is needed is a better technique for handling serviceable events while still allowing for some redundancy.

SUMMARY

A method, apparatus, system, and signal-bearing medium are provided that, in an embodiment, register each partition in a logically-partitioned computer to send local events to an aggregation component and register a first partition to send events associated with a group of partitions to the aggregation component. In various embodiments, the group may be all of the partitions or some of the partitions. If the connection to the first partition is unavailable, the first partition is registered to cancel sending events associated with the group, a second partition is selected, and the second partition is registered to send events associated with the group to the aggregation component. If the connection to the first partition is restored subsequent to being unavailable, a determination is made whether to change the registration back to the first partition. In this way, in an embodiment, redundant reporting of events is supported while decreasing the number of events reported.

BRIEF DESCRIPTION OF THE DRAWING

Various embodiments of the present invention are hereinafter described in conjunction with the appended drawings:

FIG. 2 depicts a block diagram of partition attributes, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
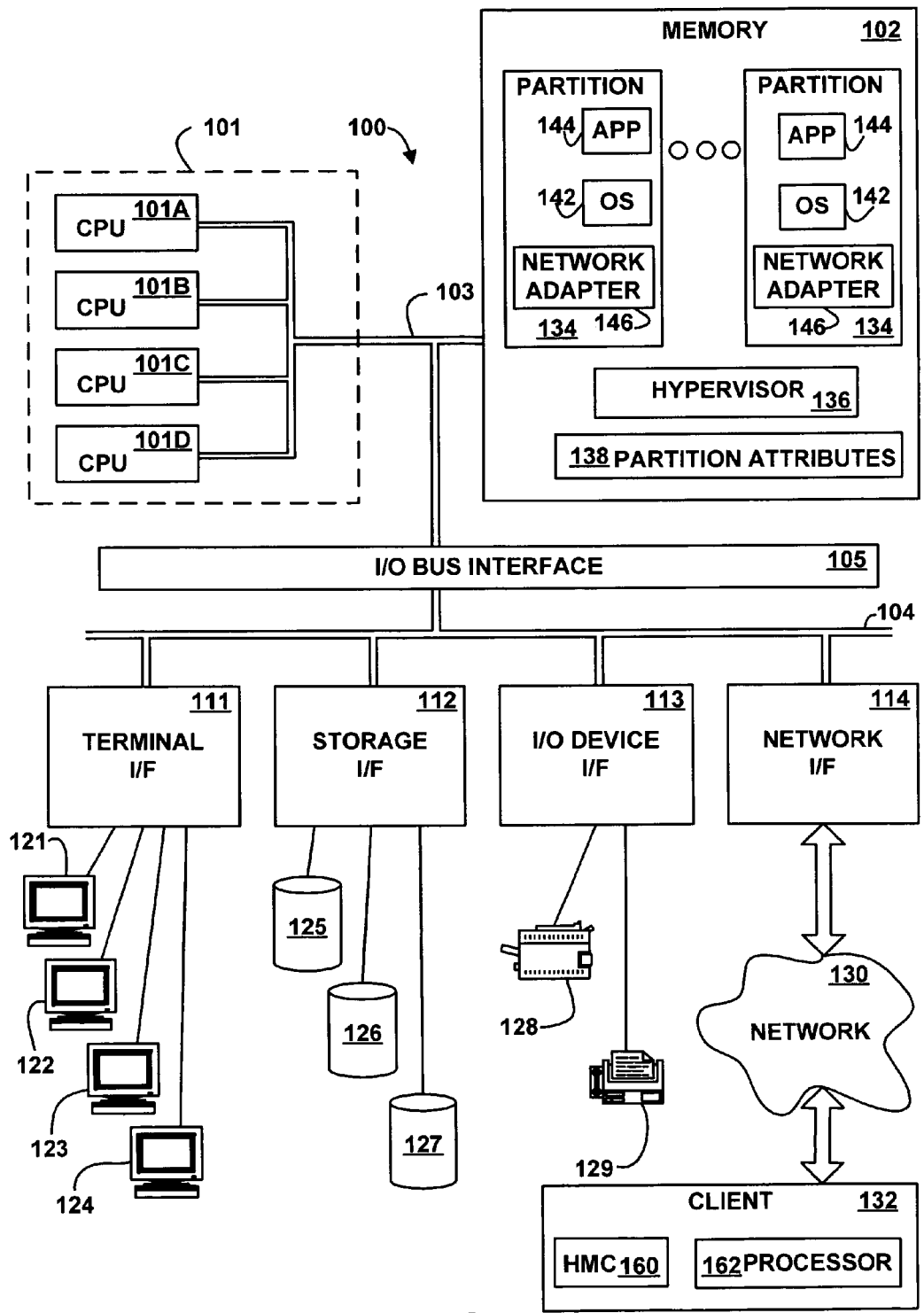
FIG. 1 depicts a block diagram of an example system for implementing an embodiment of the invention.

Referring to the Drawings, wherein like numbers denote like parts throughout the several views, FIG. 1 depicts a high-level block diagram representation of a computer system 100 connected via a network 130 to a client 132, according to an embodiment of the present invention. The terms "computer system" and "client" are used for convenience only, any appropriate electronic devices may be used, and in various embodiments a computer system or electronic device that operates as a client in one context may operate as a server in another context. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as a processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 is illustrated as containing the primary software components and resources utilized in implementing a logically-partitioned computing environment on the computer 100, including a plurality of logical partitions 134 managed by a partition manager or hypervisor 136 and partition attributes 138. Although the partitions 134, the hypervisor 136, and the partition attributes 138 are illustrated as being contained within the memory 102 in the computer system 100, in other embodiments some or all of them may be on different computer systems, e.g., the client 132 or other electronic devices accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the partitions 134, the hypervisor 136, and the partition attributes 138 are illustrated as residing in the memory 102 in the computer 100, these elements are not necessarily all completely contained in the same storage device, or in the same computer, at the same time.

Each of the logical partitions 134 utilizes an operating system 142, which controls the primary operations of the logical partition 134 in the same manner as the operating system of a non-partitioned computer. For example, each operating system 142 may be implemented using the i5OS operating system available from International Business Machines Corporation, but in other embodiments the operating system 142 may be Linux, AIX, UNIX, Microsoft Windows, or any appropriate operating system. Also, some or all of the operating systems 142 may be the same or different from each other. Any number of logical partitions 134 may be supported as is well known in the art, and the number of the logical partitions 134 resident at any time in the computer 100 may change dynamically as partitions are added or removed from the computer 100.

Each of the logical partition 134 executes in a separate, or independent, memory space, and thus each logical partition acts much the same as an independent, non-partitioned computer from the perspective of each application(s) 144 that executes in each such logical partition. As such, user applications, e.g., the applications 144, typically do not require any special configuration for use in a partitioned environment. Given the nature of logical partitions 134 as separate virtual computers, it may be desirable to support inter-partition communication to permit the logical partitions to communicate with one another as if the logical partitions were on separate physical machines. Although the logical partitions 134 are illustrated as operating as virtual computers within the computer 100, in another embodiment, one of the logical partitions 134 may operate as the entire computer, or as a group of computers, such as one or more servers connected via the network 130.

In some embodiments, the partitions 134 may support virtual local area network (LAN) adapters 146 to permit the logical partitions 134 to communicate with one another and/or the client 132 via a networking protocol such as the Ethernet protocol. In another embodiment, the virtual network adapter 146 may bridge to a physical adapter, such as the network interface adapter 114. Other manners of supporting communication between partitions 134 and the client 132 may also be supported consistent with embodiments of the invention.

Although the hypervisor 136 is illustrated as being within the memory 102, in other embodiments, all or a portion of the hypervisor 136 may be implemented in firmware or hardware. The hypervisor 136 may perform both low-level partition management functions, such as page table management and may also perform higher-level partition management functions, such as creating and deleting partitions, concurrent I/O maintenance, allocating processors, memory and other hardware or software resources to the various partitions 134. In another embodiment, the hypervisor 136 is optional, not present, or not used.

The hypervisor 136 statically and/or dynamically allocates to each logical partition 134 a portion of the available resources in computer 100. For example, each logical partition 134 may be allocated one or more of the processors 101 and/or one or more hardware threads, as well as a portion of the available memory space. The logical partitions 134 can share specific software and/or hardware resources such as the processors 101, such that a given resource may be utilized by more than one logical partition. In the alternative, software and hardware resources can be allocated to only one logical partition 134 at a time. Additional resources, e.g., mass storage, backup storage, user input, network connections, and the I/O adapters therefor, are typically allocated to one or more of the logical partitions 134. Resources may be allocated in a number of manners, e.g., on a bus-by-bus basis, or on a resource-by-resource basis, with multiple logical partitions sharing resources on the same bus. Some resources may even be allocated to multiple logical partitions at a time. The resources identified herein are examples only, and any appropriate resource capable of being allocated may be used.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and/or the client 132. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

Although the client 132 is illustrated as being connected to the computer system 100 via the network 130 and the network interface 114, in another embodiment, the client 132 may be connected to the computer system via the virtual network adapter 146 without the benefit of the network interface 114 and/or the network 130. The client 132 includes a hardware management console 160 and a processor 162. The description for the processor 162 is analogous to the description for the processor 101, as previously described above. The client 132 may further include any or all of the components previously described above for the computer 100.

The hardware management console 160 serves as an aggregation component for serviceable events received from the computer system 100. The hardware management console 160 may further receive reports of serviceable events from multiple other computer systems. The hardware management console 160 may present the events received in a user interface, may analyze the events, and/or may report one or more of the events to service personnel via the user interface, email, the network 130, telephone, fax, or any other appropriate technique. In an embodiment, the hardware management console 160 includes instructions stored in memory (analogous to the description for the memory 102) capable of executing on the processor 162 or statements capable of being interpreted by instructions executing on the processor 162 to perform the functions as further described below with reference to FIGS. 2, 3, and 5. In another embodiment, the hardware management console 160 may be implemented in microcode or firmware. In another embodiment, the hardware management console 160 may be implemented in hardware via logic gates and/or other appropriate hardware techniques.

It should be understood that FIG. 1 is intended to depict the representative major components of the computer system 100 and the client 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100 and/or the client 132, and that, when read and executed by one or more processors 101 and/or the processors 162 in the computer system 100 and/or the client 132, respectively, cause the computer system 100 and/or the client 132 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 and/or the client 132 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram of the partition attributes 138, according to an embodiment of the invention. The partition attributes 138 includes records 205, 210, 215, and 217, but in other embodiments any number of records with any appropriate data may be present. Each of the records includes a partition identifier field 220, an always active field 225, and an event types field 230, but in other embodiments more or fewer fields may be present. Although only one partition attributes data structure 138 is illustrated for all of the partitions 134, in another embodiment each of the partitions 134 or groups of partitions may have their own partition attributes 138. In another embodiment, the partition attributes 138 is packaged with the hypervisor 136.

The partition identifier field 220 identifies one or more of the partitions 134. The always active field 225 indicates whether the partition 134 identified in the partition identifier field 220 is intended to be always active, always available, or always executing. The event types field 230 indicates the type of events that the associated partition 134 identified in the partition identifier field 220 is to report to the hardware management console 160. For example, the records 205 and 215 have an event type 230 of "local," indicating that the associated partition 134 identified in the partition identifier field 220 is to report events that are local to the partition 134 to the hardware management console 160. The record 210 has an event type 230 of "platform," indicating that the associated partition is to report platform events, e.g., events that are capable of being detected by all of the partitions executing on or associated with the platform firmware/hardware, in addition to local events. The record 217 has an event type 230 of "group A," indicating that the associated partition is to report events capable of being detected by a group of the partitions 134 that is denominated "group A.". In various embodiments, the group of partitions may be all of the partitions 134 (hence, platform events are a type of group) or less than all of the partitions 134.

Figure 3:
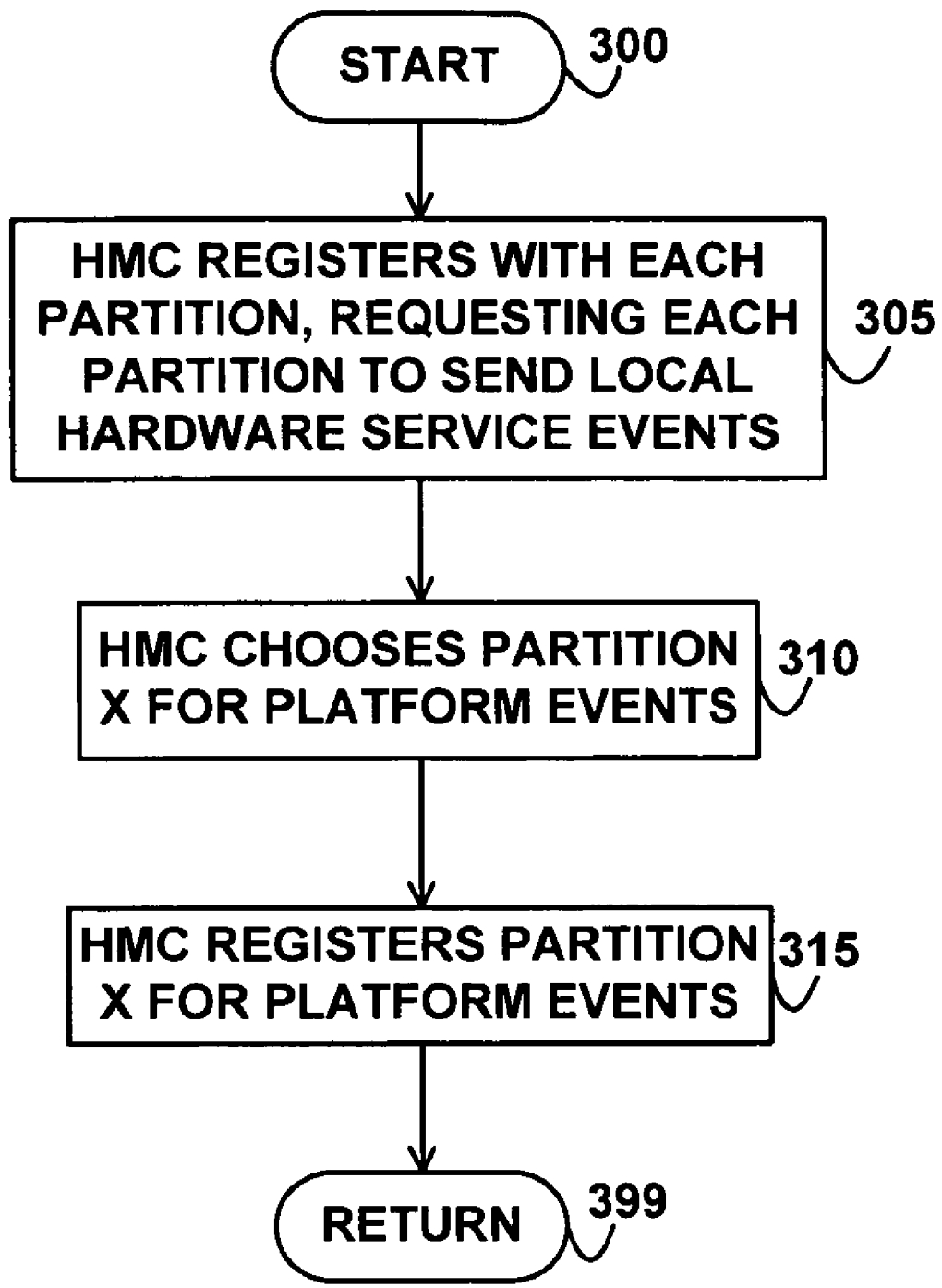
FIG. 3 depicts a flowchart of example processing for registering partitions, according to an embodiment of the invention.

FIG. 3 depicts a flowchart of example processing for registering the hardware management console 160 with the partitions 134, according to an embodiment of the invention. Control begins at block 300. Control then continues to bock 305 where the hardware management console 160 registers with each of the partitions 134, requesting each partition 138 to send hardware and/or firmware serviceable events that are local to each respective partition 138 to the hardware management console 160. In response, the partitions update the partition attributes 138 to indicate the type of events to send to the hardware management console 160.

Control then continues to block 310 where the hardware management console 160 selects one or more of the partitions 134 (denoted as partition X in this example) to send platform events that are common for all partitions. In another embodiment, the hardware management console 160 may select the partition X to send events associated with a group of partitions. The hardware management console 160 may use any appropriate criteria for selecting the partition X, for example, the hardware management console 160 may select a partition that is always active (as indicated in the field 225) or the partition that is most available. Control then continues to block 315 where the hardware management console 160 sends a request to the selected partition (partition X in this example) to register the selected partition for platform events.

In response, the selected partition updates the partition attributes 138 to indicate the type of events (event types 230) to send to the hardware management console 160. Control then continues to block 399 where the logic of FIG. 3 returns.

Figure 4:
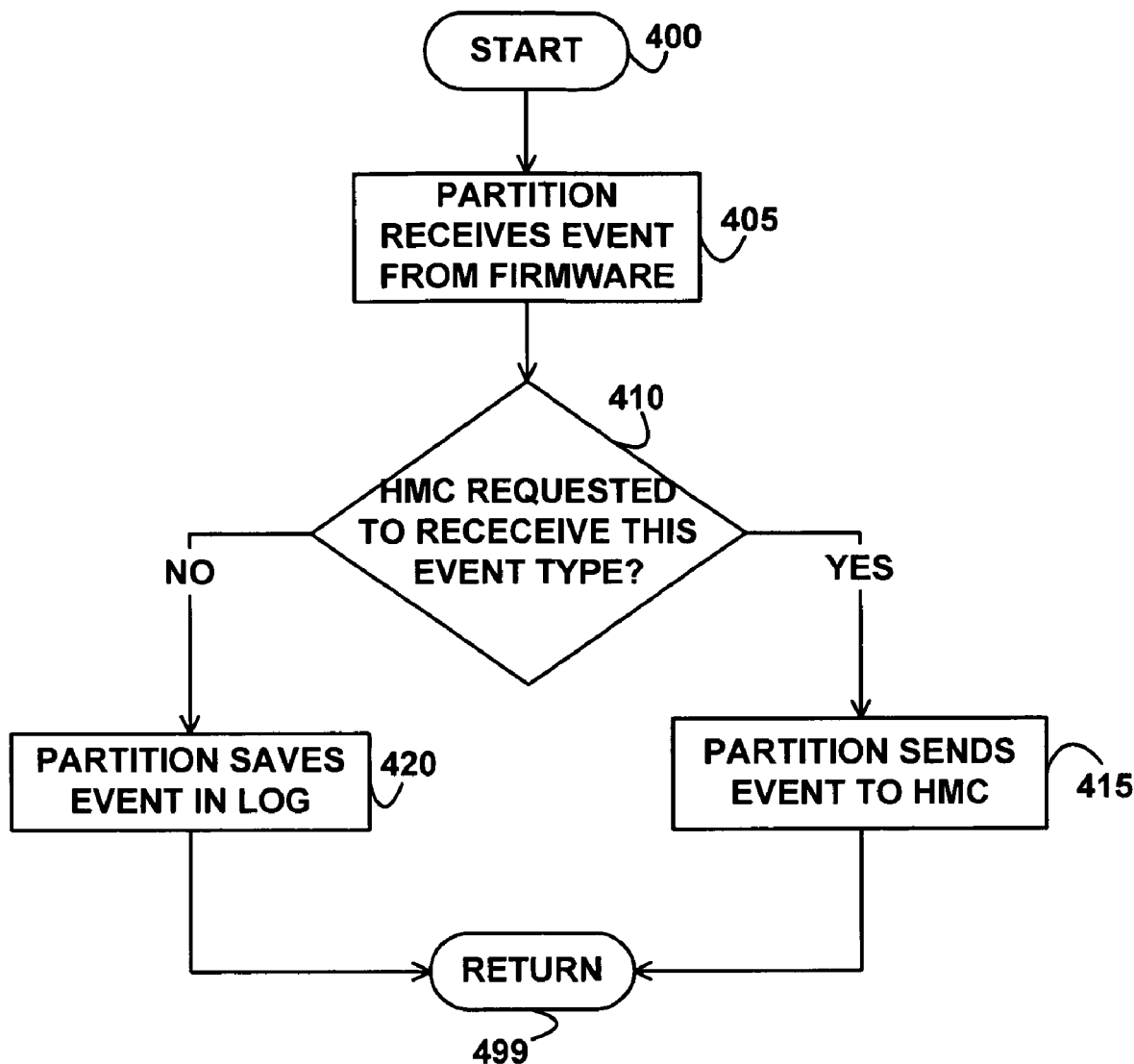
FIG. 4 depicts a flowchart of example processing for handling events at a partition, according to an embodiment of the invention.

FIG. 4 depicts a flowchart of example processing for handling events at a partition 134, according to an embodiment of the invention. Control begins at block 400. Control then continues to block 405 where the partition 134 receives an event from the firmware or hardware of the computer system 100. The event may be an error or condition, whether expected or unexpected and may be an event local to this partition and only received by this partition, an event capable of being received by a group of the partitions 134, or an event capable of being received by all partitions 134. Control then continues to block 410 where the partition 134 determines whether the hardware management console 160 has previously requested (via the registration process, as previously described above with reference to FIG. 3) to receive a report of the event type received at block 405 by examining the event types 230 in the partition attributes 138. If the determination at block 410 is true, then the hardware management console 160 has registered the partition 134 to report this event type, so control continues to block 415 where the partition 134 sends a report of the event to the hardware management console 160. Control then continues to block 499 where the logic of FIG. 4 returns.

If the determination at block 410 is false, then the hardware management console 160 has not requested to receive this event type, so control continues to block 420 where the partition 134 saves the event in a log. Control then continues to block 499 where the logic of FIG. 4 returns.

Figure 5:
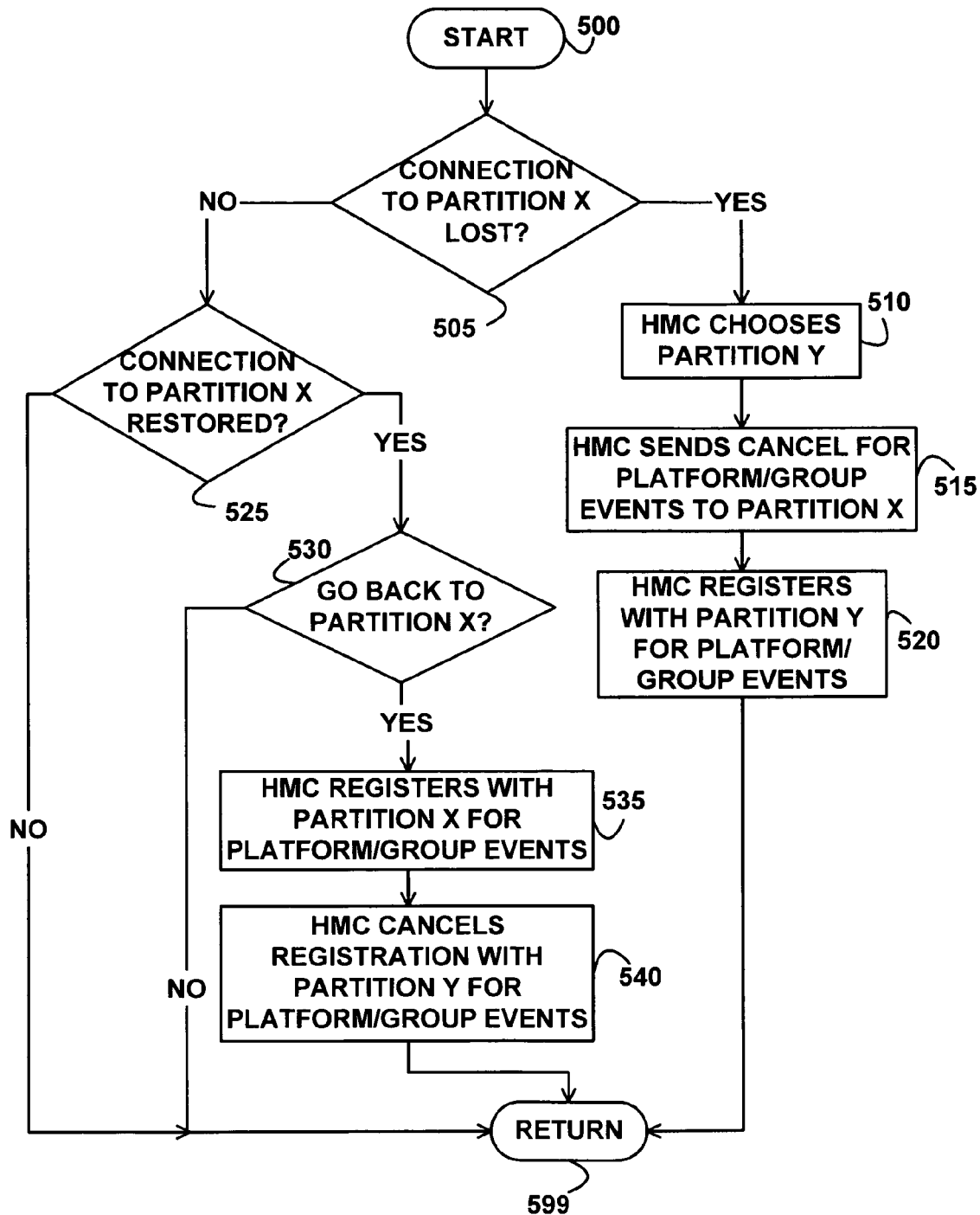
FIG. 5 depicts a flowchart of example processing for changing partition registration, according to an embodiment of the invention.

FIG. 5 depicts a flowchart of example processing for changing partition registration, according to an embodiment of the invention. Control begins at block 500. Control then continues to block 505 where the hardware management console 160 determines whether a connection to the partition X (the partition that is registered to send platform events or events relating to a group of partitions) has been lost or become unavailable.

If the determination at block 505 is true, then the connection to the partition that is registered to send platform events has been lost or is unavailable, so control continues to block 510 where the hardware management console 160 chooses another, alternative, partition 134 (partition Y in this example) to send platform events (or events common to a group of partitions to the hardware management console 160. The hardware management console 160 may select a partition that is intended to be always active or a partition that is the most available, or the hardware management console 160 may use any other appropriate selection technique.

Control then continues to block 515 where the hardware management console 160 sends a registration request to the partition X to cancel sending platform or group events. In response, the partition X updates the partition attributes 138 accordingly. Control then continues to block 520 where the hardware management console 160 sends a registration request to the alternative partition Y to start sending platform or group events. In response, the alternative partition Y updates the event types field 230 in the partition attributes 138 accordingly. Control then continues to block 599 where the logic of FIG. 5 returns.

If the determination at block 505 is false, then the connection to the partition X has not been lost or become unavailable, so control continues to block 525 where the hardware management console 160 determines whether the connection to the partition X was previously unavailable, but is now restored. If the determination at block 525 is true, then the connection to the partition X has been restored, so control continues to block 530 where the hardware management console 160 determines whether to change registration for platform (or group) events from partition Y back to partition X (the partition that was originally registered to send platform or group events). In various embodiments, the hardware management console 160 may make this determination based on which partition (X or Y) is more available based on whether the partition X or the partition Y is designated as always active 225, or based on any other appropriate criteria.

If the determination at block 530 is true, then the hardware management console 160 has decided to change the registration for platform (or group) events back to partition X, so control continues to block 535 where the hardware management console 160 sends a request the partition X registering the partition X to send platform (or group) events to the hardware management console 160. In response, partition X updates the event types field 230 in the partition attributes 138 accordingly.

Control then continues to block 540 where the hardware management console 160 sends a request to the partition Y canceling registration for platform (or group) events. In response, partition Y updates the event types field 230 in the partition attributes 138 accordingly. Control then continues to block 599 where the logic of FIG. 5 returns.

If the determination at block 530 is false, then the hardware management console 160 has decided not to change the registration for platform (or group) events, so control continues to block 599 where the logic of FIG. 5 returns.

If the determination at block 525 is false, then the connection to the partition X (registered to send platform or group events) has not been restored, so control continues to block 599 where the logic of FIG. 5 returns.

Figure 6:
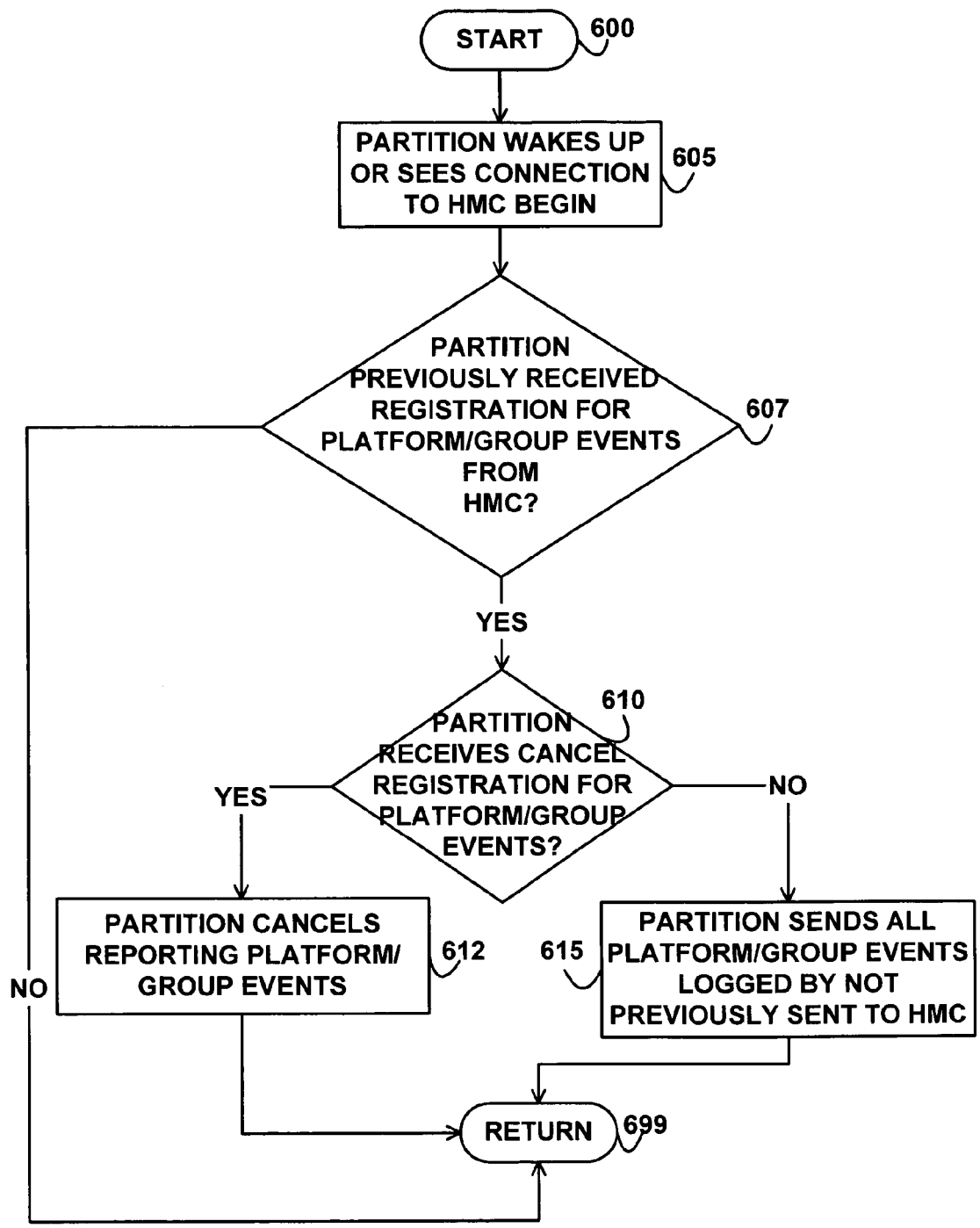
FIG. 6 depicts a flowchart of example processing for connection initiation at a partition, according to an embodiment of the invention.

FIG. 6 depicts a flowchart of example processing for connection initiation at a partition 134, according to an embodiment of the invention. Control begins at block 600. Control then continues to block 605 where the partition wakes up, initializes, or detects that a connection to the hardware management console 160 has been initiated. Control then continues to block 607 where the partition 134 determines whether it has previously received a registration for platform or group events from the hardware management console 160.

If the determination at block 607 is true, then the partition 134 has previously received a registration for platform or group events, so control then continues to block 610 where the partition 134 determines whether a cancel registration request for platform or group events has been received from the hardware management console 160. If the determination at block 610 is true, then a cancel registration request for platform or group events has been received from the hardware management console 160, so control continues to block 612 where the partition 134 updates the event types field 230 in the partition attributes 138 accordingly to cancel reporting of platform or group events. Control then continues to block 699 where the logic of FIG. 6 returns.

If the determination at block 610 is false, then a cancel registration request has not been received for platform or group events, so control continues to block 615 where the partition 1334 sends all platform or group events logged by not previously sent to the hardware management console 160. Control then continues to block 699 where the logic of FIG. 6 returns.

If the determination at block 605 is false, then the partition 134 has not previously received a registration for platform or group events, so control continues form block 607 to block 699 where the logic of FIG. 6 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    registering each of a plurality of partitions to send events that are local to each of the plurality of partitions to an aggregation component, wherein the aggregation component receives the events that are local to each of the plurality of partitions from all of the plurality of partitions, wherein the respective event that is local to the respective partition comprises an error that is only received by the respective partition and is not encountered by any other of the plurality of partitions;
    selecting a first partition from the plurality of partitions; and
    registering the first partition to send events associated with a group of the plurality of partitions to the aggregation component, wherein the events associated with the group comprise errors that are capable of being encountered by all of the plurality of partitions in the group;
    if a connection to the first partition is unavailable, registering the first partition to cancel sending events associated with the group, selecting a second partition of the plurality of partitions, and registering the second partition to send events associated with the group to the aggregation component;
    if a connection to the first partition is restored subsequent to being unavailable, determining whether to change registration; and
    if the determining is true, registering the second partition to cancel sending events associated with the group, and registering the first partition to send events associated with the group to the aggregation component.

2. The method of claim 1, wherein the group comprises all of the plurality of partitions.

3. The method of claim 1, wherein the group comprises less than all of the plurality of partitions.

4. The method of claim 1, wherein the events associated with the group comprise events associated with platform firmware on which the group executes.

5. The method of claim 1, wherein the plurality of partitions comprise partitions in a logically-partitioned computer.

6. The method of claim 1, wherein the determining is based on which of the first partition and the second partition is more available.

7. A method for configuring a logically-partitioned computer, comprising:
    configuring the logically-partitioned computer to register each of a plurality of partitions in the logically-partitioned computer to send events that are local to each of the plurality of partitions to an aggregation component, wherein the aggregation component receives the events that are local to each of the plurality of partitions from all of the plurality of partitions, wherein the respective event that is local to the respective partition comprises an error that is only received by the respective partition and is not encountered by any other of the plurality of partitions;
    configuring the logically-partitioned computer to select a first partition from the plurality of partitions; and
    configuring the logically-partitioned computer to register the first partition to send events associated with a group of the plurality of partitions to the aggregation component, wherein the events associated with the group comprise errors that are capable of being encountered by all of the plurality of partitions in the group;
    configuring the logically-partitioned computer to, if a connection to the first partition is unavailable, register the first partition to cancel sending events associated with the group, select a second partition of the plurality of partitions, and register the second partition to send events associated with the group to the aggregation component;
    configuring the logically-partitioned computer to, if a connection to the first partition is restored subsequent to being unavailable, determine whether to change registration, and if the determination is true, register the second partition to cancel sending events associated with the group, and register the first partition to send events associated with the group to the aggregation component.

8. The method of claim 7, further comprising:
    configuring the computer to determine whether to change registration based on which of the first partition and the second partition is more available.

9. The method of claim 7, wherein the group comprises all of the plurality of partitions and the events comprise all serviceable events associated with platform firmware on which the plurality of partitions execute.

* * * * *